United States Patent
Johnson et al.

(10) Patent No.: US 11,913,340 B2
(45) Date of Patent: Feb. 27, 2024

(54) AIR SEAL SYSTEM WITH BACKSIDE ABRADABLE LAYER

(71) Applicant: RAYTHEON TECHNOLOGIES CORPORATION, Farmington, CT (US)

(72) Inventors: Dean Johnson, Springvale, ME (US); Thomas E. Clark, Wells, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/843,113

(22) Filed: Jun. 17, 2022

(65) Prior Publication Data
US 2023/0407757 A1    Dec. 21, 2023

(51) Int. Cl.
*F01D 11/12* (2006.01)
*F01D 11/00* (2006.01)
*F01D 11/02* (2006.01)
*F01D 11/24* (2006.01)
*F01D 25/00* (2006.01)
*F01D 25/12* (2006.01)

(52) U.S. Cl.
CPC .......... *F01D 11/125* (2013.01); *F01D 11/005* (2013.01); *F01D 11/02* (2013.01); *F01D 11/24* (2013.01); *F01D 25/12* (2013.01); *F01D 25/005* (2013.01); *F05D 2240/11* (2013.01); *F05D 2240/55* (2013.01); *F05D 2300/6033* (2013.01)

(58) Field of Classification Search
CPC .......... F01D 11/02; F01D 11/08; F01D 11/12; F01D 11/122; F01D 11/125; F01D 11/127; F01D 11/24; F01D 25/12; F01D 25/005; F01D 11/005; F05D 2240/55; F05D 2260/201; F05D 2300/6033; F05D 2240/11
See application file for complete search history.

(56) References Cited

U.S. PATENT DOCUMENTS

| 7,287,956 B2 | 10/2007 | Bracken et al. |
| 11,187,100 B2 | 11/2021 | Barker et al. |
| 2007/0077141 A1* | 4/2007 | Keller ............. F01D 11/08 415/136 |
| 2016/0258311 A1* | 9/2016 | Varney ............. F01D 25/12 |
| 2017/0268370 A1 | 9/2017 | McCaffrey |

(Continued)

FOREIGN PATENT DOCUMENTS

| EP | 3792456 | 3/2021 |
| FR | 2580033 | 10/1986 |
| WO | 2014186099 | 11/2014 |

OTHER PUBLICATIONS

European Search Report for European Application No. 23179883.6 dated Sep. 11, 2023.

*Primary Examiner* — Christopher Verdier
(74) *Attorney, Agent, or Firm* — Carlson, Gaskey & Olds, P.C.

(57) ABSTRACT

A seal system for a gas turbine engine includes a ceramic matrix composite (CMC) seal arc segment and a carrier supporting the CMC seal arc segment. The CMC seal arc segment defines radially inner and outer sides and has an abradable layer disposed on the radially outer side. There is a cooling cavity radially between the carrier and the abradable layer. The carrier includes a ridge that projects into a groove in the abradable layer and provides a labyrinth seal that partitions the cooling cavity into sub-cavities.

11 Claims, 3 Drawing Sheets

(56) References Cited

U.S. PATENT DOCUMENTS

| | | | |
|---|---|---|---|
| 2019/0277143 A1* | 9/2019 | Ishiguro | F01D 5/18 |
| 2020/0149426 A1* | 5/2020 | Strock | C23C 28/30 |
| 2021/0071584 A1* | 3/2021 | Barker | F01D 25/246 |
| 2021/0140340 A1* | 5/2021 | Shiramasa | F01D 25/12 |
| 2021/0148251 A1 | 5/2021 | Freeman et al. | |

* cited by examiner

AIR SEAL SYSTEM WITH BACKSIDE ABRADABLE LAYER

BACKGROUND

A gas turbine engine typically includes a fan section, a compressor section, a combustor section, and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

The turbine section may include a row of air seals positioned near the tips of the turbine blades. The air seals are in close proximity to the blade tips to provide a minimum clearance distance and thereby reduce leakage of combustion gases around the tips. As the air seals are exposed to the hot exhaust gas flow, cooling air is provided to the air seals for thermal management.

SUMMARY

A seal system for a gas turbine engine according to an example of the present disclosure includes a ceramic matrix composite (CMC) seal arc segment that defines radially inner and outer sides, and has an abradable layer disposed on the radially outer side. A carrier supports the CMC seal arc segment, and there is a cooling cavity radially between the carrier and the abradable layer. The carrier includes a ridge that projects into a groove in the abradable layer and thereby provides a labyrinth seal that partitions the cooling cavity into sub-cavities.

In a further embodiment of any of the foregoing embodiments, the ridge has a knife edge.

In a further embodiment of any of the foregoing embodiments, the abradable layer is selected from the group consisting of pure silicon, yttria stabilized zirconia, gadolinia stabilized zirconia, and combinations thereof.

In a further embodiment of any of the foregoing embodiments, the carrier includes radially inner and outer carrier sides. The radially inner carrier side bounds the sub-cavities. The carrier includes a first supply passage that opens at the radially outer carrier side and at the radially inner carrier side to one of the sub-cavities, and the carrier includes a second supply passage that opens at the radially outer carrier side and at the radially inner carrier side to another, different one of the sub-cavities.

In a further embodiment of any of the foregoing embodiments, the outer side of the CMC arc segment has a pair of hooks that define a dovetail slot there between. The carrier has a dovetail disposed in the dovetail slot, and the first supply passage and the second supply passage are through the dovetail.

In a further embodiment of any of the foregoing embodiments, the CMC seal arc segment defines forward and aft sides, one of the hooks of the pair of hooks is elongated along the forward side, and the other of the hooks of the pair of hooks is elongated along the aft side.

In a further embodiment of any of the foregoing embodiments, the sub-cavities are pressurized at different pressures.

In a further embodiment of any of the foregoing embodiments, the carrier, including the ridge, is selected from the group consisting of a Ni-based alloy and a cobalt-based alloy.

A gas turbine engine according to an example of the present disclosure includes a compressor section, a combustor in fluid communication with the compressor section, and a turbine section in fluid communication with the combustor. The turbine section has a seal system disposed about a central axis of the gas turbine engine. The seal system includes a ceramic matrix composite (CMC) seal arc segment that defines radially inner and outer sides and has an abradable layer disposed on the radially outer side. A carrier supports the CMC seal arc segment, and there is a cooling cavity radially between the carrier and the abradable layer. The carrier includes a ridge that projects into a groove in the abradable layer and thereby provides a labyrinth seal that partitions the cooling cavity into sub-cavities.

In a further embodiment of any of the foregoing embodiments, the carrier includes radially inner and outer carrier sides. The radially inner carrier side bounds the sub-cavities. The carrier includes a first supply passage that opens at the radially outer carrier side and at the radially inner carrier side to one of the sub-cavities. The carrier includes a second supply passage that opens at the radially outer carrier side and at the radially inner carrier side to another, different one of the sub-cavities. The outer side of the CMC arc segment has a pair of hooks that define a dovetail slot there between. The carrier has a dovetail disposed in the dovetail slot, and the first supply passage and the second supply passage are through the dovetail.

In a further embodiment of any of the foregoing embodiments, the ridge has a knife edge.

In a further embodiment of any of the foregoing embodiments, the sub-cavities are pressurized at different pressures.

In a further embodiment of any of the foregoing embodiments, the abradable layer is selected from the group consisting of pure silicon, yttria stabilized zirconia, gadolinia stabilized zirconia, and combinations thereof, and the carrier, including the ridge, is selected from the group consisting of a Ni-based alloy and a cobalt-based alloy.

A method according to an example of the present disclosure includes providing a ceramic matrix composite (CMC) seal arc segment that has radially inner and outer sides, attaching an abradable layer on the radially outer side of the CMC seal arc segment, providing a carrier to support the CMC seal arc segment, the carrier including a ridge, and sliding the CMC seal arc segment relative to the carrier such that during the sliding the ridge cuts a groove into the abradable layer. The ridge remains disposed in the groove to thereby provide a labyrinth seal that partitions the cooling cavity between the carrier and the CMC seal arc segment into sub-cavities.

In a further embodiment of any of the foregoing embodiments, the outer side of the CMC arc segment has a pair of hooks that define a dovetail slot there between. The carrier has a dovetail, and the sliding includes sliding the dovetail into the dove slot.

In a further embodiment of any of the foregoing embodiments, the ridge has a knife edge.

In a further embodiment of any of the foregoing embodiments, the abradable layer is selected from the group consisting of pure silicon, yttria stabilized zirconia, gadolinia stabilized zirconia, and combinations thereof, and the carrier, including the ridge, is selected from the group consisting of a Ni-based alloy and a cobalt-based alloy.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
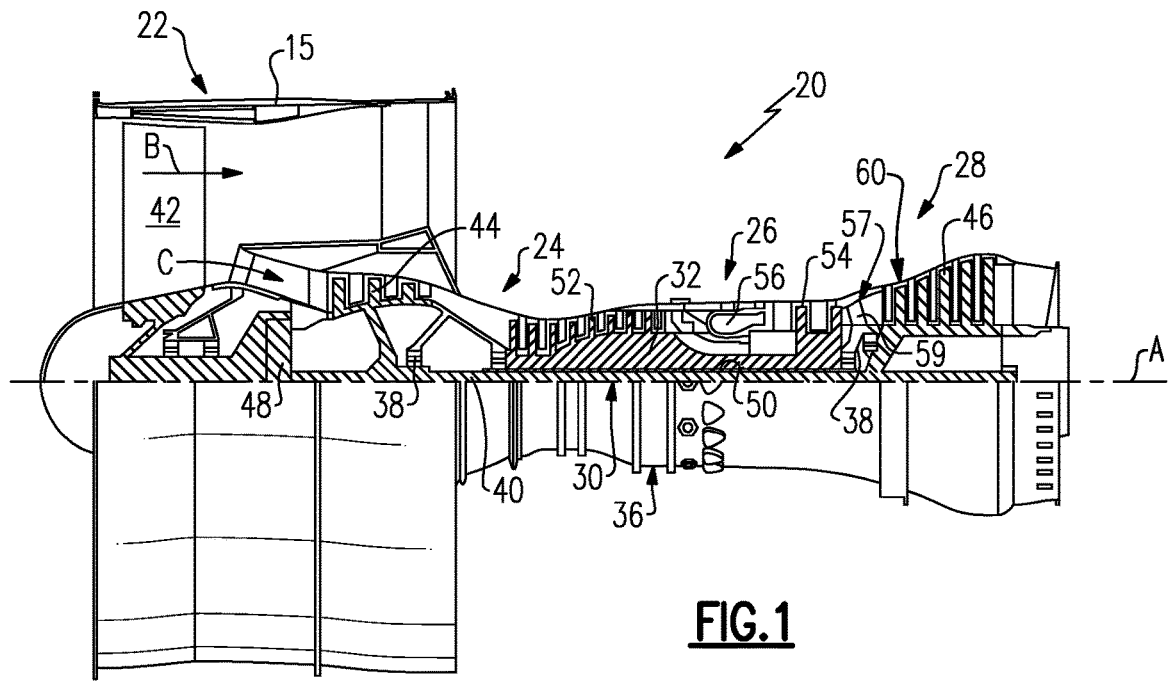
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
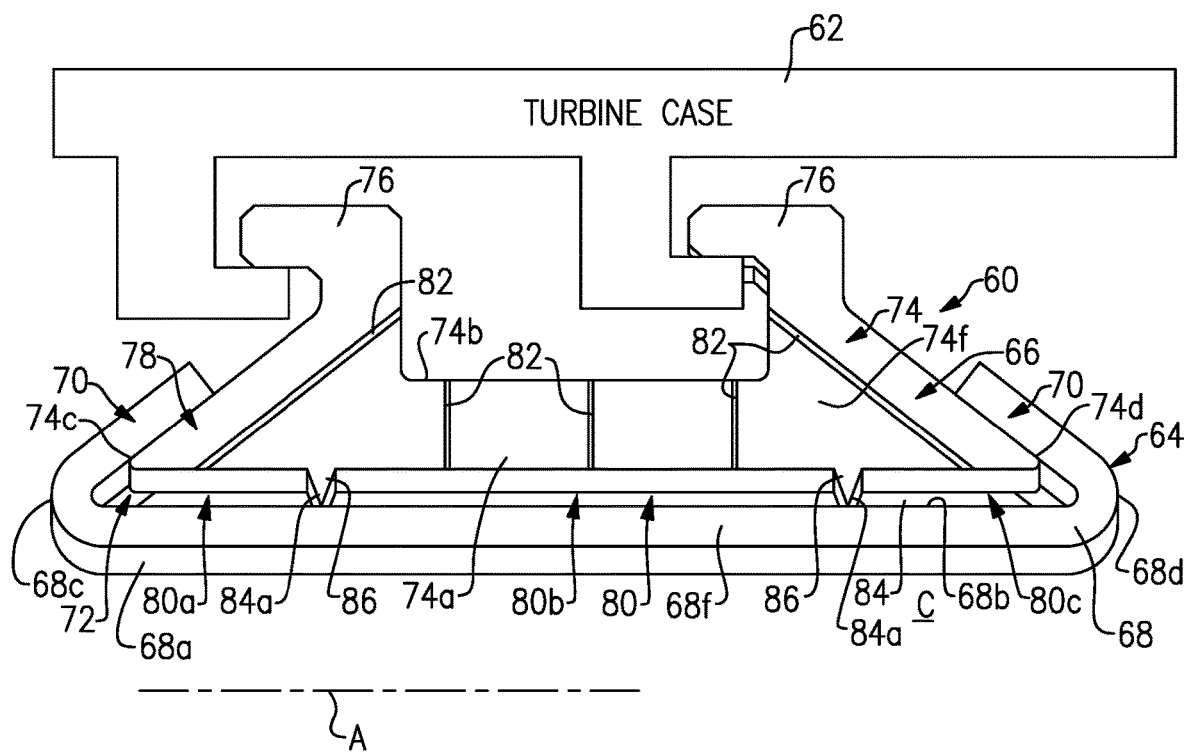
FIG. 2 illustrates a portion of the turbine section of the engine.

FIG. 2 illustrates a portion from the turbine section 28 of the engine 20. The turbine section 28 includes a seal system 60 that is situated radially outwardly of a row of turbine blades (not shown). For example, the seal system 60 may function to provide a minimal clearance distance with the tips of the blades to facilitate a reduction in leakage of combustion gases around the tips. In this example, the seal system 60 is directly attached to a turbine case 62, although there may alternatively be one or more intermediate structures between the seal system and the case 62.

Figure 3A:
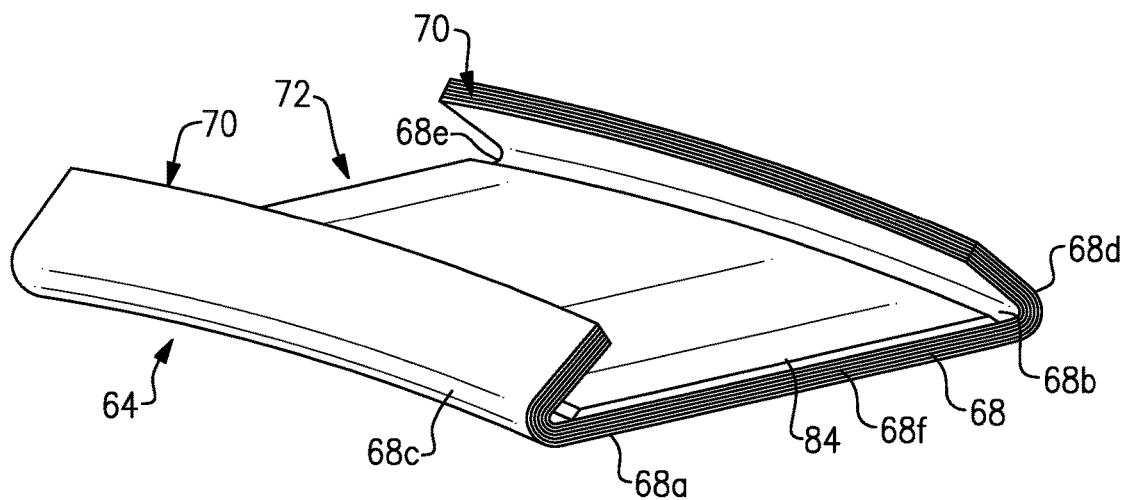
FIG. 3A illustrates an isometric view of a seal arc segment.
Figure 3B:
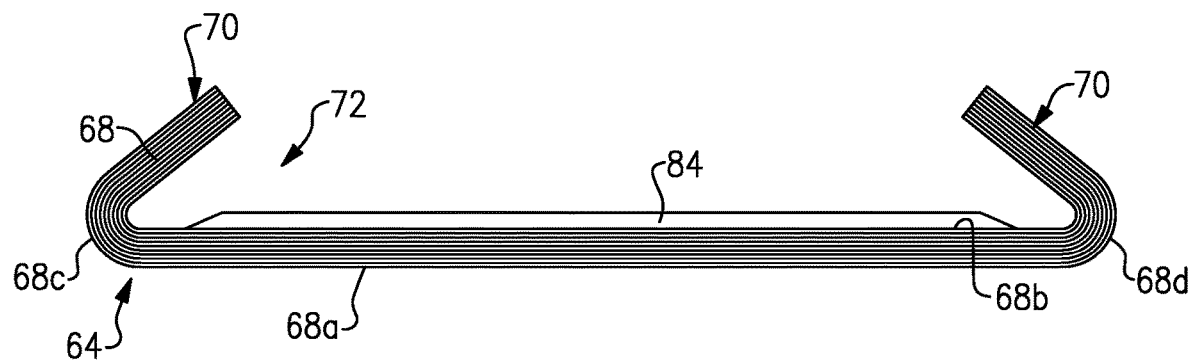
FIG. 3B illustrates a sectioned view of the seal arc segment.

The seal system 60 includes a row of ceramic matrix composite (CMC) seal arc segments 64 (one shown) disposed around the engine central longitudinal axis A (superimposed on the figure) and a carrier 66 that supports the segment 64 via attachment to the case 62. Referring also to FIGS. 3A and 3B that show an isolated view of the segment 64 and a cross-section of the segment 64, respectively, the segment 64 is formed by a main body 68 that defines radially inner and outer sides 68a/68b, forward and aft sides 68c/68d, and circumferential sides 68e/68f. The radially inner side 68a faces the core gaspath C.

In this example, on the outer side 68b the segment 64 includes a pair of hooks 70 that slope inwards toward the axial midline of the segment 64 and define a dovetail slot 72 there between. The forward one of the hooks 70 is elongated along the forward side 68c, and the aft one of the hooks 70 is elongated along the aft side 68d. Each of the hooks 70 extends the full circumferential distance from one circumferential side 68e to the other circumferential side 68f.

The CMC material from which the CMC vane arc segments 64 are made of is comprised of a ceramic reinforcement, which is usually continuous ceramic fibers, in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. The fiber plies have a fiber architecture, which refers to an ordered arrangement of the fiber tows relative to one another, such as a 2D woven ply or a 3D structure.

The illustrated geometry of the segment 64 is amenable to ceramic processing. For instance, the segment 64 may be fabricated by laying-up fiber plies on a mandrel or tool that replicates the geometry of the dovetail slot 72. The fiber plies may be wrapped around the mandrel to form the hooks 70. The mandrel may then be removed and the green fiber structure is densified with the ceramic matrix, such as by chemical vapor infiltration or polymer impregnation and pyrolysis.

Figure 4A:
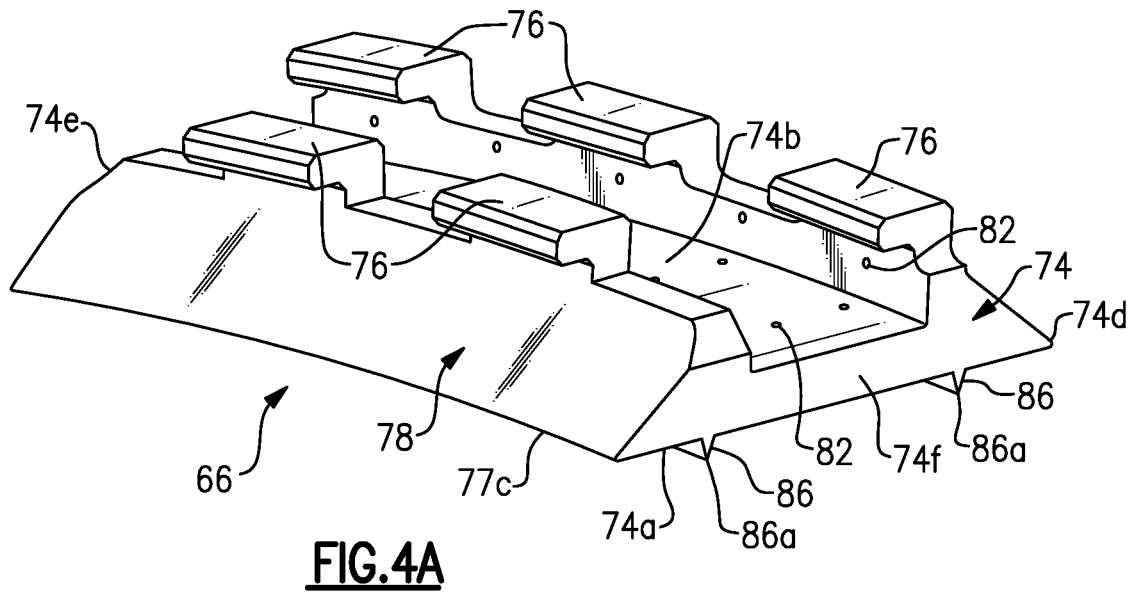
FIG. 4A illustrates an isometric view of a carrier that supports the seal arc segment.
Figure 4B:
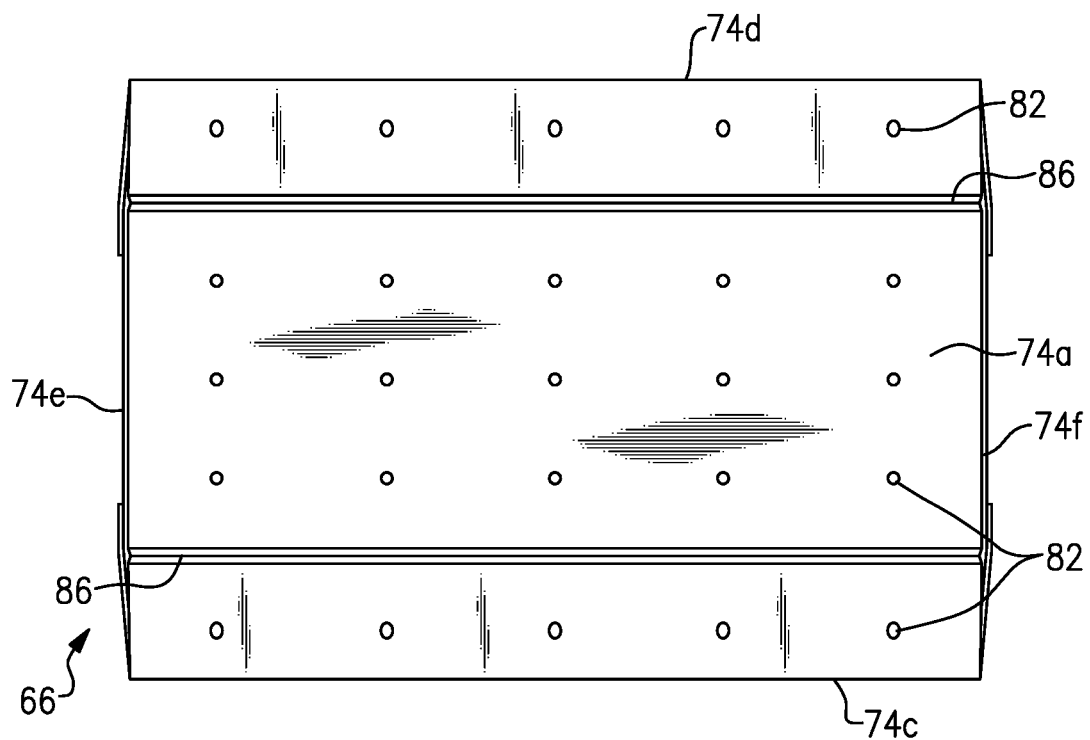
FIG. 4B illustrates a radial view of the carrier.

Referring also to FIGS. 4A and 4B that show, respectively, an isometric view of the carrier 66 and a radial view (from the axis A looking radially outwards) of the carrier 66, the carrier 66 includes a main body 74 that defines radially inner and outer carrier sides 74a/74b, forward and aft carrier sides 74c/74d, and circumferential carrier sides 74e/74f. In this example, the carrier 66 includes hooks 76 on the radially outer carrier side 74b that serve to attach the carrier 66 to the case 62. The forward and aft carrier sides 74c/74d are sloped so as to form a dovetail 78. The dovetail 78 is complementary in geometry to the dovetail slot 72 so as to be slidably receivable into the dovetail slot 72 to secure the segment 64 and the carrier 66 together. As shown in FIG. 2, the segment 64 "hangs" on the carrier 66 such that there is a cooling cavity 80, i.e., a plenum, defined between the inner carrier side 74a and the outer side 68b of the segment 64. The carrier 66 is made of a metallic alloy, such as a nickel-based or cobalt-based superalloy.

To facilitate cooling of the seal system 60, cooling air, such as bleed air from the compressor section 24, is provided to the backside of the carrier 66 (outer carrier side 74b). The carrier 66 includes supply passages 82 that each open to the outer carrier side 74b and to the inner carrier side 74a to deliver the cooling air into the cooling cavity 80. At least a portion of the supply passages 82 extend through the dovetail 78.

The segment 64 includes an abradable layer 84 disposed on the radially outer side 68b. For example, the abradable layer 84 may be selected from, but is not limited to, pure silicon, yttria stabilized zirconia, gadolinia stabilized zirconia, and combinations thereof. The inner carrier side 74a of the carrier 66 includes one or more ridges 86 (two shown). In this example, each ridge 86 is elongated in the circumferential direction and extends fully from one side 74e to the other side 74f of the carrier 66. The ridge 86 has a radial height that exceeds the radial distance between the inner carrier side 74a and the surface of the abradable layer 84 such that the ridge 86 cuts a groove 84a into the abradable layer 84. The ridge 86 is abrasive relative to the abradable layer 84. That is, when the ridge 86 rubs on the abradable layer 86, the abradable layer 86 is worn by the ridge 86. The ridge 86 is not worn, or is at least worn substantially less than the abradable layer 84. In this regard, the abradable layer 84 may have a hardness, a porosity, or a combination thereof that render it abradable by the ridge 86, which as above may be made of nickel-based or cobalt-based superalloy. The term "cut" or variations thereof that are used in this disclosure thus refer to the physical capability of the ridge or ridges 86 to abrade the abradable layer 84 to form the groove or grooves 84a.

Each ridge 86 extends into its corresponding groove 84a and thereby partitions the cooling cavity 80 into sub-cavities, which in this example are indicated at 80a/80b/80c. The engagement of the ridge 86 into the groove 84a also provides a labyrinth seal such that the sub-cavities 80a/80b/80c are substantially flow- and pressure-isolated from each other. In this example, as the ridges 86 fully extend from side 74e to side 74f of the carrier 66, the sub-cavity 80a is an axially forward sub-cavity, the sub-cavity 80c is an axially aft sub-cavity, and the sub-cavity 80b is an axially intermediate sub-cavity. That is, the sub-cavities 80a/80b/80c are in an axially serial arrangement. The carrier 66 may alternatively have a single ridge 86 to provide two sub-cavities, or additional ridges 86 to provide more than three sub-cavities.

The compartmentalization of the cavity 80 into the sub-cavities 80a/80b/80c by the ridge(s) 86 and groove(s) 84a enables the cooling air to be tailored across the seal system 60. For example, the cooling passages 82 meter flow of the cooling air. Through selection of the size and number of the cooling passages 82, the flow and pressure of the cooling air provided to each of the sub-cavities 80a/80b/80c is manipulated to pressurize the sub-cavities 80a/80b/80c at different pressures.

In one example, the flow and pressure of the cooling air provided to each of the sub-cavities 80a/80b/80c is manipulated with respect to the axially changing pressure profile in the core gaspath C. Along the axial extent of the segment 64, the core gaspath pressure is highest at regions forward of the blades. The core gaspath pressure is lowest at regions aft of the blades, and the core gaspath pressure is at an intermediate level across the blades (between their forward and leading edges). The cooling air provided to the seal system is pressurized from the compressor section 24. The pressure of the cooling air and pressures in the core gaspath C, and especially the pressure ratio between these, can causes stresses in the segment 64.

The size and number of the cooling passages 82 that feed the cooling air to each of the sub-cavities 80a/80b/80c is selected such that the sub-cavities 80a are pressurized at progressively lower pressures, i.e., the sub-cavity 80a has the highest pressure, the sub-cavity has the lowest pressure, and the sub-cavity 80b has an intermediate pressure. The pressure in each sub-cavity 80a/80b/80c is coordinated to the core gaspath pressure at the axial location of the sub-cavity 80a/80b/80c along the core gaspath C to facilitate reduction in the local pressure ratio at that sub-cavity 80a/80b/80c, to thereby facilitate stress reduction in the segment 64 due to the pressure ratio. In terms of flow-metering, the number and/or size of the cooling passages 82 feeding the sub-cavity 80a will be greater than that of the cooling passages 82 feeding the sub-cavity 80b, which in turn will be greater than that of the cooling passages 82 feeding the sub-cavity 80c. The size and/or number of the cooling passages 82 may also be selected in coordination with cooling requirements of the seal system 60 to provide a desired balance of cooling and pressure ratio for stress reduction.

Also disclosed is a method for the seal system 60. The method may be used for an original manufacture of the seal system 60 or as part of a repair or replacement process. The method includes providing the segment 64 and attaching the abradable layer 84 on the radially outer side 68b of the segment 64. For instance, the abradable layer 84 is a coating that is deposited, such as by air plasma spraying, on the radially outer side 68b, thereby attaching to the surface of the segment 64. Alternatively, the abradable layer 84 may be pre-manufactured and then subsequently attached to the radially outer side 68b in a thermal bonding step. For a repair, a prior abradable layer may be fully or partially removed and then a new abradable layer or portion may be attached.

Following the attachment of the abradable layer 84 to the segment 64, segment 64 is then mated with the carrier 66 by sliding the segment 74 onto the carrier 66. For instance, the dovetail slot 72 of the segment 64 is aligned with the dovetail 78 of the carrier 66 and then slid onto the dovetail 78. As the segment 64 slides onto the carrier, the ridge or ridges 86 cut into the abradable layer 84 to form the groove or grooves 84a. In this regard, to facilitate cutting, the ridges 86 may include a knife edge 86a (FIG. 4A). A knife edge is a tapering of the ridge 86, such as from the base of the ridge, to a high-radius point (tip) that focuses the force from the ridge 86 on the abradable layer 84. As will be appreciated, the length-wise direction of each ridge 86 will be substantially aligned with the sliding direction so that the ridge 86 cuts a uniform groove 84a, whereas in contrast if the ridge were angled it may scrape across the abradable layer 84 rather than form a functional groove. In one further example, the groove 84a may be at least partially pre-formed prior to contact with the ridge 86. For instance, the groove 84a may be cut or machined into the abradable layer 84 before sliding the segment 64 onto the carrier 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal system for a gas turbine engine comprising:
   a ceramic matrix composite (CMC) seal arc segment defining radially inner and outer sides and having an abradable layer disposed on the radially outer side;
   a carrier supporting the CMC seal arc segment;
   a cooling cavity radially between the carrier and the abradable layer; and
   the carrier including a ridge projecting into a groove in the abradable layer and thereby providing a labyrinth seal that partitions the cooling cavity into sub-cavities, the ridge having a knife edge.

2. The seal system as recited in claim 1, wherein the abradable layer is selected from the group consisting of pure silicon, yttria stabilized zirconia, gadolinia stabilized zirconia, and combinations thereof.

3. The seal system as recited in claim 1, wherein the carrier includes radially inner and outer carrier sides, the radially inner carrier side bounds the sub-cavities, the carrier includes a first supply passage that opens at the radially outer carrier side and at the radially inner carrier side to one of the sub-cavities, and the carrier includes a second supply passage that opens at the radially outer carrier side and at the radially inner carrier side to another, different one of the sub-cavities.

4. The seal system as recited in claim 3, wherein the outer side of the CMC arc segment has a pair of hooks that define a dovetail slot there between, the carrier has a dovetail disposed in the dovetail slot, and the first supply passage and the second supply passage are through the dovetail.

5. The seal system as recited in claim 4, wherein the CMC seal arc segment defines forward and aft sides, one of the hooks of the pair of hooks is elongated along the forward side, and the other of the hooks of the pair of hooks is elongated along the aft side.

6. The seal system as recited in claim 1, wherein the sub-cavities are pressurized at different pressures.

7. The seal system as recited in claim 1, wherein the carrier, including the ridge, is selected from the group consisting of a Ni-based alloy and a cobalt-based alloy.

8. A gas turbine engine comprising:
   a compressor section;
   a combustor in fluid communication with the compressor section; and
   a turbine section in fluid communication with the combustor, the turbine section having a seal system disposed about a central axis of the gas turbine engine, the seal system including:
   a ceramic matrix composite (CMC) seal arc segment defining radially inner and outer sides and having an abradable layer disposed on the radially outer side; and
   a carrier supporting the CMC seal arc segment;
   a cooling cavity radially between the carrier and the abradable layer; and the carrier including a ridge projecting into a groove in the abradable layer and thereby providing a labyrinth seal that partitions the cooling cavity into sub-cavities, the ridge having a knife edge.

9. The gas turbine engine as recited in claim 8, wherein the carrier includes radially inner and outer carrier sides, the radially inner carrier side bounds the sub-cavities, the carrier includes a first supply passage that opens at the radially outer carrier side and at the radially inner carrier side to one of the sub-cavities, the carrier includes a second supply passage that opens at the radially outer carrier side and at the radially inner carrier side to another, different one of the sub-cavities, the outer side of the CMC arc segment has a pair of hooks that define a dovetail slot there between, the carrier has a dovetail disposed in the dovetail slot, and the first supply passage and the second supply passage are through the dovetail.

10. The gas turbine engine as recited in claim 8, wherein the sub-cavities are pressurized at different pressures.

11. The gas turbine engine as recited in claim 10, wherein the abradable layer is selected from the group consisting of pure silicon, yttria stabilized zirconia, gadolinia stabilized zirconia, and combinations thereof, and the carrier, including the ridge, is selected from the group consisting of a Ni-based alloy and a cobalt-based alloy.

* * * * *